(12) United States Patent
Narusawa

(10) Patent No.: US 6,904,289 B1
(45) Date of Patent: Jun. 7, 2005

(54) METHOD AND APPARATUS THAT ANNUNCIATES WHEN A MOBILE TELEPHONE IS OUT OF A SERVICE AREA

(75) Inventor: Hideki Narusawa, Tokyo (JP)

(73) Assignee: NEC Corporation, Tokyo (JP)

( * ) Notice: Subject to any disclaimer, the term of this patent is extended or adjusted under 35 U.S.C. 154(b) by 550 days.

(21) Appl. No.: 09/662,892

(22) Filed: Sep. 15, 2000

(30) Foreign Application Priority Data

Sep. 17, 1999 (JP) .......................... 11-264035

(51) Int. Cl.⁷ .............. H04Q 7/32; H04Q 7/20
(52) U.S. Cl. ............ 455/522; 455/462; 455/566; 455/550.1; 340/825.22
(58) Field of Search ................ 455/522, 462, 455/566, 550; 340/825.22

(56) References Cited

U.S. PATENT DOCUMENTS

| | | | | |
|---|---|---|---|---|
| 5,542,103 A | * | 7/1996 | Mottier et al. | 455/566 |
| 5,847,657 A | * | 12/1998 | Tsuchiyama | 340/7.27 |
| 5,894,276 A | * | 4/1999 | Altidor et al. | 340/825.22 |
| 5,999,809 A | * | 12/1999 | Watanabe | 455/421 |
| 6,081,725 A | * | 6/2000 | Ishida | 455/462 |
| 6,167,288 A | * | 12/2000 | Ishihara | 455/566 |
| 6,208,838 B1 | * | 3/2001 | Isomichi et al. | 340/7.21 |
| 6,216,385 B1 | * | 4/2001 | Abe | 340/7.34 |
| 6,219,540 B1 | * | 4/2001 | Besharat et al. | 455/421 |

FOREIGN PATENT DOCUMENTS

| | | |
|---|---|---|
| JP | 58-15345 | 1/1983 |
| JP | 1-318326 | 12/1989 |
| JP | 3-108848 | 5/1991 |
| JP | 4-207724 | 7/1992 |
| JP | 5-48516 | 2/1993 |
| JP | 7-254872 | 10/1995 |
| JP | 10-51856 | 2/1998 |
| JP | 11-122649 | 4/1999 |

* cited by examiner

Primary Examiner—Nick Corsaro
Assistant Examiner—Alan T. Gantt
(74) Attorney, Agent, or Firm—McGinn & Gibb, PLLC

(57) ABSTRACT

The mobile telephone includes a detector, a timer and an annunciator. The detector transmits a detection signal when the detector detects that the mobile telephone is in a stand-by mode and is located out of a service area. The timer starts measuring a period of time in response to the detection signal. The annunciator makes at least one of sounds and vibration when a period of time measured by the timer reaches a predetermined first period of time.

3 Claims, 2 Drawing Sheets

METHOD AND APPARATUS THAT ANNUNCIATES WHEN A MOBILE TELEPHONE IS OUT OF A SERVICE AREA

BACKGROUND OF THE INVENTION

1. Field of the Invention

The invention relates to a method of annunciating a user that a mobile telephone is located out of a service area, and a mobile telephone having a function of doing the same, and more particularly to a method of annunciating a user that a mobile telephone is not capable of making communication, because the mobile telephone is located out of a service area, and a mobile telephone having a function of doing the same.

Herein, a term "a mobile telephone" includes a portable phone, an automobile phone, a cellular phone, a phone having functions of a codeless phone and a cellular phone, used in personal handy phone system (PHS), and other similar phones.

2. Description of the Related Art

Various methods have been suggested to annunciate a user of a mobile telephone that the mobile telephone cannot make communication with other mobile telephones, when the mobile telephone is in a stand-by mode where the mobile telephone is waiting receiving radio signals from a base station, because the mobile telephone is located out of a service area.

For instance, Japanese Patent No. 2,870,077 has suggested a method of annunciating a user that a mobile telephone is located out of a service area, including the step of displaying an indicator such as an icon on a display screen which indicator indicates that the mobile telephone is located out of a service area.

In this method, a user cannot realize that he/she or a mobile telephone is located out of a service area unless he/she looks at the display screen. Hence, the method is accompanied with a problem that if he/she forgets having a mobile telephone with him/her and makes an appointment to meet somebody at a place located out of a service area, somebody cannot make communication with his/her mobile telephone, if somebody wants to change a place at which they are to meet each other.

In addition, the method is accompanied with another problem due to the fact that a user cannot realize that he/she or a mobile telephone is located out of a service area unless he/she looks at the display screen. Even if a user realizes that he/she has a mobile telephone with him/her, he/she may not realize that he/she or the mobile telephone moves out of a service area, when the mobile telephone is put in a bag. In such a case, somebody having an appointment with him/her to meet each other cannot make communication with him/her.

Japanese Unexamined Patent Publication No. 7-87010 has suggested a battery saving circuit to be used in a mobile telephone. The circuit judges that a mobile telephone is located within a service area, if the circuit can detect a control signal transmitted from a base station, and that a mobile telephone is located out of a service area, if the circuit cannot detect the control signal.

Japanese Unexamined Patent Publication No. 10-13330 has suggested a battery saving circuit to be used in a mobile telephone. In this circuit, a field intensity of a radio signal transmitted from a base station is compared to a threshold intensity to thereby judge whether a mobile telephone is located within a service area or out of a service area.

Japanese Unexamined Patent Publication No. 6-311101 has suggested a portable wireless phone including first means for judging whether a phone is located within a service area, and timers which switch a period of time between a first period of time including a turn-on period and a turn-off period in accordance with an output signal transmitted from the first means, and a second period of time including a turn-off period longer than the first period of time. When the portable wireless telephone is located within a service area, while the telephone is in a stand-by mode, a power supply supplying power to a signal receiver is controlled at the first period of time, and when the portable wireless telephone is located out of a service area, the power supply is controlled at the second period of time.

Japanese Unexamined Patent Publication No. 11-41168 has suggested a mobile telephone. A power supply is turned off when the mobile telephone is located within a service area. When a predetermined period of time has passed after the power supply was turned off, the power supply is automatically turned on. This ensures that a lifetime of a battery is lengthened.

However, the above-mentioned problems remain unsolved even in the mobile telephones suggested in the above-mentioned Publications.

SUMMARY OF THE INVENTION

It is an object of the present invention to provide a mobile telephone which enables a user to realize that he/she is located out of a service area.

It is also an object of the present invention to provide a method of annunciating a user that he/she is located out of a service area.

In a first exemplary aspect of the invention, a method of operating a mobile telephone includes annunciating through at least one of sounds and vibration when the mobile telephone has been out of a service area for a predetermined first period of time and is in a stand-by mode and setting the predetermined first period of time.

Preferably, the method includes returning to the stand-by mode.

In a second exemplary aspect of the invention, a method of operating a mobile telephone includes annunciating through at least one of sounds and vibration when the mobile telephone has been out of a service area for a predetermined first period of time and is in a stand-by mode and turning off a power supply of the mobile telephone.

Preferably, the method includes returning to the stand-by mode, if the mobile telephone moves into the service area before the predetermined first period of time has passed after the mobile telephone has moved out of the service area.

In a third exemplary aspect of the invention, a method of operating a mobile telephone includes annunciating through at least one of sounds and vibration when the mobile telephone has been out of a service area for a predetermined first period of time and is in a stand-by mode and ceasing the annunciation and returning to the stand-by mode if the mobile telephone moves into the service area while the annunciation is being carried out.

Preferably, the method includes selecting at least one of a speaker constituting a hand-set, a sounder making a single or mixed sound, and a vibrator which vibrates the mobile telephone, for the annunciating.

In a fourth exemplary aspect of the invention, a method of operating a mobile telephone includes annunciating through at least one of sounds and vibration when the mobile telephone has been out of a service area for a predetermined first period of time and is in a stand-by mode and setting a second period of time in which the annunciating is carried out.

Preferably, the method includes ceasing the annunciating in response to actuation of a predetermined key.

In a fifth exemplary aspect of the invention, a method of operating a mobile telephone includes annunciating through at least one of sounds and vibration when the mobile telephone has been out of a service area for a predetermined first period of time and is in a stand-by mode and a second period of time in which the annunciating is carried out is fixed and ceasing the annunciating in response to actuation of a predetermined key.

In a sixth exemplary aspect of the invention, a mobile telephone includes (a) a detector that transmits a detection signal when the detector detects that the mobile telephone is in a stand-by mode and is located out of a service area; (b) a timer that starts measuring a period of time in response to the detection signal; (c) at least one annunciator that makes at least one of sounds and vibration when the period of time measured by the timer reaches a predetermined first period of time; and (d) an interface that sets the predetermined first period of time.

Preferably, the detector returns the mobile telephone to the stand-by mode after the annunciator has finished annunciating.

In a seventh exemplary aspect of the invention, a mobile telephone includes a detector that transmits a detection signal when the detector detects that the mobile telephone is in a stand-by mode and is located out of a service area a timer that starts measuring a period of time in response to the detection signal and the annunciator that makes at least one of sounds and vibration when the period of time measured by the timer reaches a predetermined first period of time in which the detector interrupts the power supply to the mobile telephone, after the annunciator has finished annunciation.

Preferably, the detector returns the mobile telephone to the stand-by mode, if the mobile telephone moves into the service area before the predetermined first period of time has passed after the mobile telephone had moved out of the service area.

In an eighth exemplary aspect of the invention, a mobile telephone includes a detector that transmits a detection signal when the detector detects that the mobile telephone is in a stand-by mode and is located out of a service area, a timer that starts measuring a period of time in response to the detection signal and an annunciator that makes at least one of sounds and vibration when the period of time measured by the timer reaches a predetermined first period of time and the detector ceases annunciation and returns the mobile telephone to the stand-by mode, if the mobile telephone moves into the service area while the annunciation is being carried out.

Preferably, the mobile telephone includes a speaker constituting a hand-set, a sounder making a single or mixed sound, a vibrator which vibrates the mobile telephone and an interface through which data can be input into the mobile telephone, and where a user can select at least one of the speaker, the sounder and the vibrator as the annunciator through the interface.

In a ninth exemplary aspect of the invention, a mobile telephone includes a detector that transmits a detection signal when the detector detects that the mobile telephone is in a stand-by mode and is located out of a service area, a timer that starts measuring a period of time in response to the detection signal, an annunciator that makes at least one of sounds and vibration when the period of time measured by the timer reaches a predetermined first period of time, and an interface through which data can be input into the mobile telephone, and in which a second period of time in which the annunciation is carried out can be determined by a user through the interface.

Preferably, the mobile telephone includes an interface through which data can be input into the mobile telephone, and where a user can compulsively cease the annunciation through the interface, while the annunciation is being carried out.

In a tenth exemplary aspect of the invention, a mobile telephone includes a detector that transmits a detection signal when the detector detects that the mobile telephone is in a stand-by mode and is located out of a service area, a timer that starts measuring a period of time in response to the detection signal, an annunciator that makes at least one of sounds and vibration when the period of time measured by the timer reaches a predetermined first period of time, and an interface through which data can be input into the mobile telephone, and where a second period of time in which the annunciation is carried out is fixed, and a user can compulsively cease the annunciation through the interface, while the annunciation is being carried out.

Preferably, the mobile telephone waits to receive a radio signal from a base station during the stand-by mode.

Preferably, the mobile telephone waits to receive a radio signal from a base station during the stand-by mode.

The advantages obtained by the aforementioned present invention will described hereinbelow.

In accordance with the present invention, when the mobile telephone has been out of a service area for a predetermined first period of time, while the mobile telephone is in a stand-by mode where the mobile telephone is waiting to receive radio signals from a base station, the mobile telephone annunciates to a user that he/she has been out of service area for a predetermined first period of time, by making sounds and/or vibration. Hence, a user can soon realize that he/she has been out of a service area for a predetermined first period of time, even when he/she puts the mobile telephone in a bag, and accordingly, he/she cannot look at an indicator displayed in a display screen which indicator indicates that the mobile telephone is now located out of a service area.

In accordance with the present invention, only when the mobile telephone has been out of service area for a predetermined first period of time, annunciation to a user is carried out. Accordingly, for instance, when a user walks repeatedly into a service area and out of service area, annunciation is not repeated each time a user walks out of a service area.

In accordance with the present invention, even when a user forgets having a mobile telephone with him/her, he/she is automatically annunciated that he/she has been out of a service area for a predetermined first period of time. The annunciation makes a user realize that he/she has a mobile telephone with him/her, and that he/she is now located out of a service area. Thus, even when a user made an appointment with somebody to meet each other at a place located out of a service area, somebody can give a call to a user to change a place to meet each other.

In accordance with the present invention, since a user can realize that he/she has been out of a service area for a predetermined first period of time, by means of the annunciator, he/she may move into a service area or turn off the mobile telephone, which ensures that a battery equipped in the mobile telephone could lengthen its lifetime. This is because a battery for the mobile telephone consumes much more power out of a service area than in a service area, because various detection operations have to be carried out, if the mobile telephone is located out of a service area.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

A preferred embodiment in accordance with the present invention will be explained hereinbelow with reference to drawings.

Figure 1:
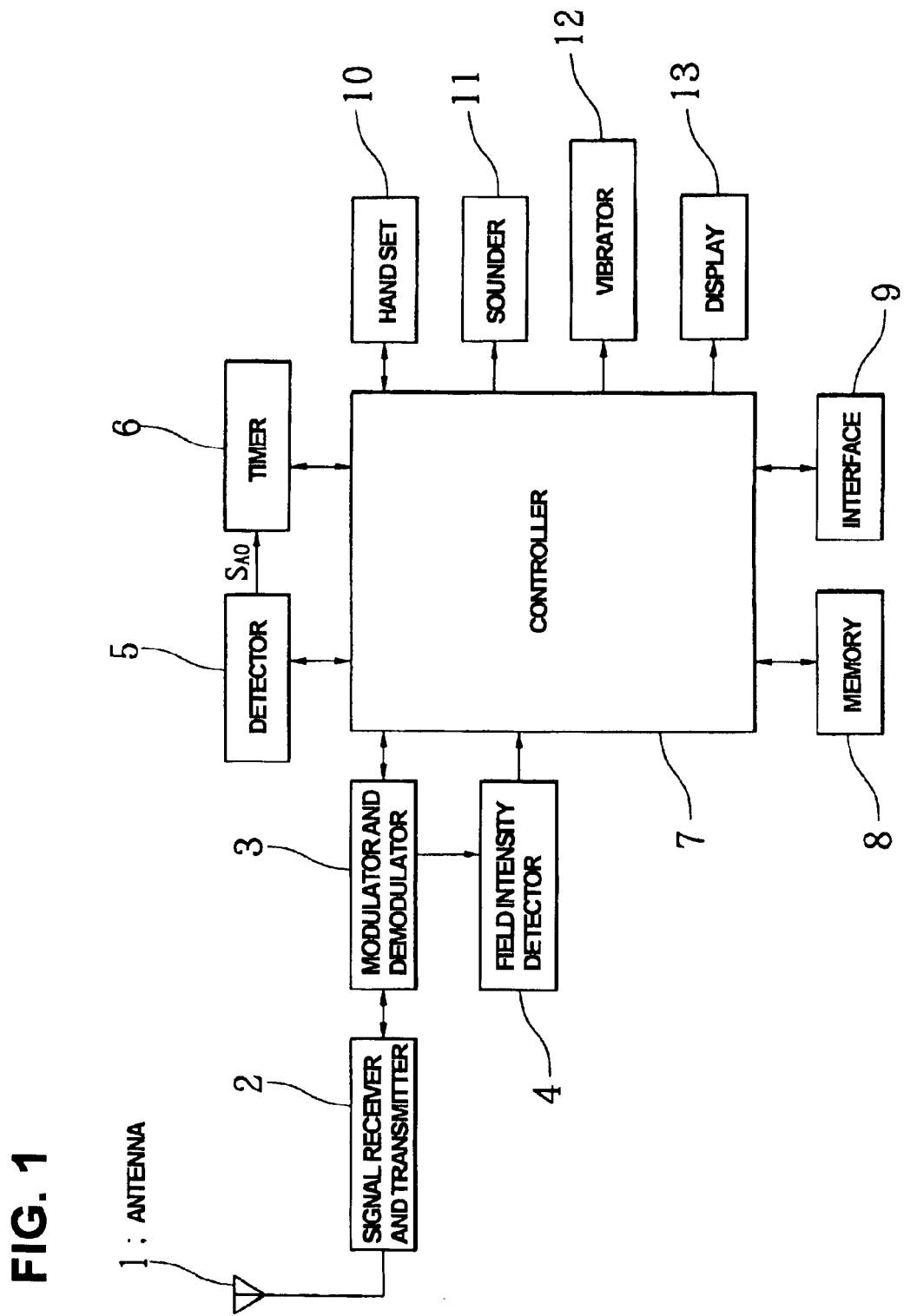
FIG. 1 is a block diagram of a mobile telephone in accordance with the preferred embodiment of the present invention.

FIG. 1 is a block diagram of a mobile telephone in accordance with the embodiment of the present invention.

The mobile telephone is comprised of an antenna 1, a signal receiver and transmitter 2, a modulator and demodulator 3, a field intensity detector 4 which detects an intensity of an electric field, a detector 5 which detects whether the mobile telephone is located within a service area or out of a service area, a timer 6, a controller 7, a memory 8, an interface 9, a handset 10, a sounder 11, a vibrator 12, and a display 13.

The signal receiver and transmitter 2 receives a radio signal from a base station or a parent phone (both not illustrated) through the antenna 1, and transmits the thus receives radio signal to the modulator and demodulator 3. The signal receiver and transmitter 3 further transmits a radio signal transmitted from the modulator and demodulator 3, to a base station or a parent phone through the antenna 1.

The modulator and demodulator 3 demodulates a radio signal transmitted from the signal receiver and transmitter 2 to take out audio signals, communication data and control signals therefrom, and transmits the thus taken-out signals and data to the controller 7. In addition, the modulator and demodulator 3 modulates audio signals, communication data and control signals transmitted from the controller 7, into radio signals, and transmits the thus modulated radio signals to the signal receiver and transmitter 2.

The field intensity detector 4 detects a field intensity of a radio signal received in the antenna 1, based on the demodulated signals transmitted from the modulator and demodulator 3.

The detector 5 realizes that the mobile telephone is in a stand-by mode where the mobile telephone is waiting for radio signals from a base station, and judges whether the mobile telephone is located within a service area or out of a service area, based on an output signal transmitted from the field intensity detector 4. When the detector 5 detects that the mobile telephone is located out of a service area, the detector 5 transmits a detection signal $S_{AO}$ to the timer 6.

The timer 6 includes a memory (not illustrated) storing therein a predetermined first period of time T1. As mentioned later, when the mobile telephone has been out of a service area for the first period of time T1, the handset 10, the sounder 11 and/or the vibrator annunciates a user that he/she is now located out of a service area, through sounds and/or vibration.

On receipt of the detection signal $S_{AO}$ from the detector 5, the timer 6 starts counting down by one clock from the first period of time T1 to zero. The first period of time T1 can be determined by a user through the interface 9.

The controller 7 controls other parts of the mobile telephone, and operates in accordance with the control signals transmitted from the modulator and demodulator 3. In addition, the controller 7 processes the audio signals transmitted from the modulator and demodulator 3, and transmits the thus processed audio signals to the handset 10. The controller 7 further processes audio signals transmitted from the handset 10, and transmits the thus processed audio signals to the modulator and demodulator 3.

The memory 8 is comprised of a semiconductor memory such as a random access memory (RAM). The memory 8 stores telephone numbers input by a user through the interface 9, what is selected by a user as an annunciator among the handset 10, the sounder 11, the vibrator 12 and the display 13, and a second period of time T2 in which a user is annunciated by the selected annunciator that he/she keeps located out of a service area for the first period of time T1. A user can select an annunciator among the handset 10, the sounder 11, the vibrator 12 and the display 13 through the interface 9, and determine the second period of time T2 through the interface 9.

The interface 9 includes numeral keys 0 to 9 for inputting telephone numbers and so on, and various keys for allowing making communication, finishing communication, switching what is displayed in the display screen 13, and correcting date and time.

The handset 10 is comprised of a speaker and a microphone. The handset 10 transmits sound through the speaker, based on the audio signals transmitted from the controller 7, and supplies audio signals converted from voices by the microphone, to the controller 7 to thereby make communication with an opponent or annunciate a user that he/she has been out of service area.

The sounder 11 makes a single tone sound to let a user know that the mobile telephone receives a call, or to annunciate to a user that that he/she has been out of a service area.

The vibrator 12 vibrates a body of the mobile telephone to let a user know that the mobile telephone receives a call, or to annunciate to a user that that he/she has been out of a service area.

The display 13 includes a liquid crystal display. The display 13 displays present date and time, various data such as a telephone number of an opponent, or an indicator such as an icon to annunciate a user that that he/she has been out of a service area.

Hereinbelow is explained how the first and second period of times T1 and T2 are determined, and how an annunciator is selected among the handset 10, the sounder 11, the vibrator 12 and the display 13.

First, the first period of time T1 is determined as follows.

A user operates the interface 9 to thereby put the controller 7 in a mode for setting a first period of time T1. Thus, the controller 7 reads out a couple of period of times stored in the memory equipped in the timer 6, as the first period of time T1, and displays them in the display screen 13. For instance, the memory stores 30, 60 and 90 minutes as the first period of time T1, which are read out by the controller 7, and then, are displayed in the display screen 13. For instance, the memory stores 90 minutes as a default of the first period of time T1.

Looking at the display screen 13, a user selects one of the period of times displayed in the display screen 13, through the interface 9. If a user selects none, a default period of time is automatically determined as the first period of time T1. If a period of time whish a user desires is not displayed in the display screen 13, a user can input his/her desired period of time through the interface 9, and determine the thus input period of time as the first period of time T1.

The controller 7 stores the thus determined first period of time T1 in the memory equipped in the timer 6.

Second, the second period of time T2 and an annunciator are determined as follows.

First, a user operates the interface 9 to put the controller 7 into a mode for determining a second period of time T2 and an annunciator. Thus, the controller 7 reads out a couple of period of times stored in the memory 8 as the second period of time T2, and annunciators stored in the memory 8. Then, the controller 7 displays the thus read-out period of times and annunciators in the display screen 13. For instance, the memory 8 stores 5, 10 and 20 seconds as the second period of time T2. For instance, the memory 8 stores 10 seconds as a default of the second period of time T2. For instance, the memory 8 stores a display, a vibrator, a sounder and a handset therein as annunciators, in which a display is stored as a default.

Looking at the display screen 13, a user selects one of the period of times displayed in the display screen 13, through the interface 9. If a user selects none, a default period of time is automatically determined as the second period of time T2. If a period of time whish a user desires is not displayed in the display screen 13, a user can input his/her desired period of time through the interface 9, and determine the thus input period of time as the second period of time T2.

Looking at the display screen 13, a user further selects one or more of the annunciators displayed in the display screen 13, through the interface 9. If a user selects none, a default annunciator to annunciate to a user that he/she has been out of a service area for the first period of time T1.

The controller 7 stores the thus selected second period of time T2 and annunciator in the memory 8.

Figure 2:
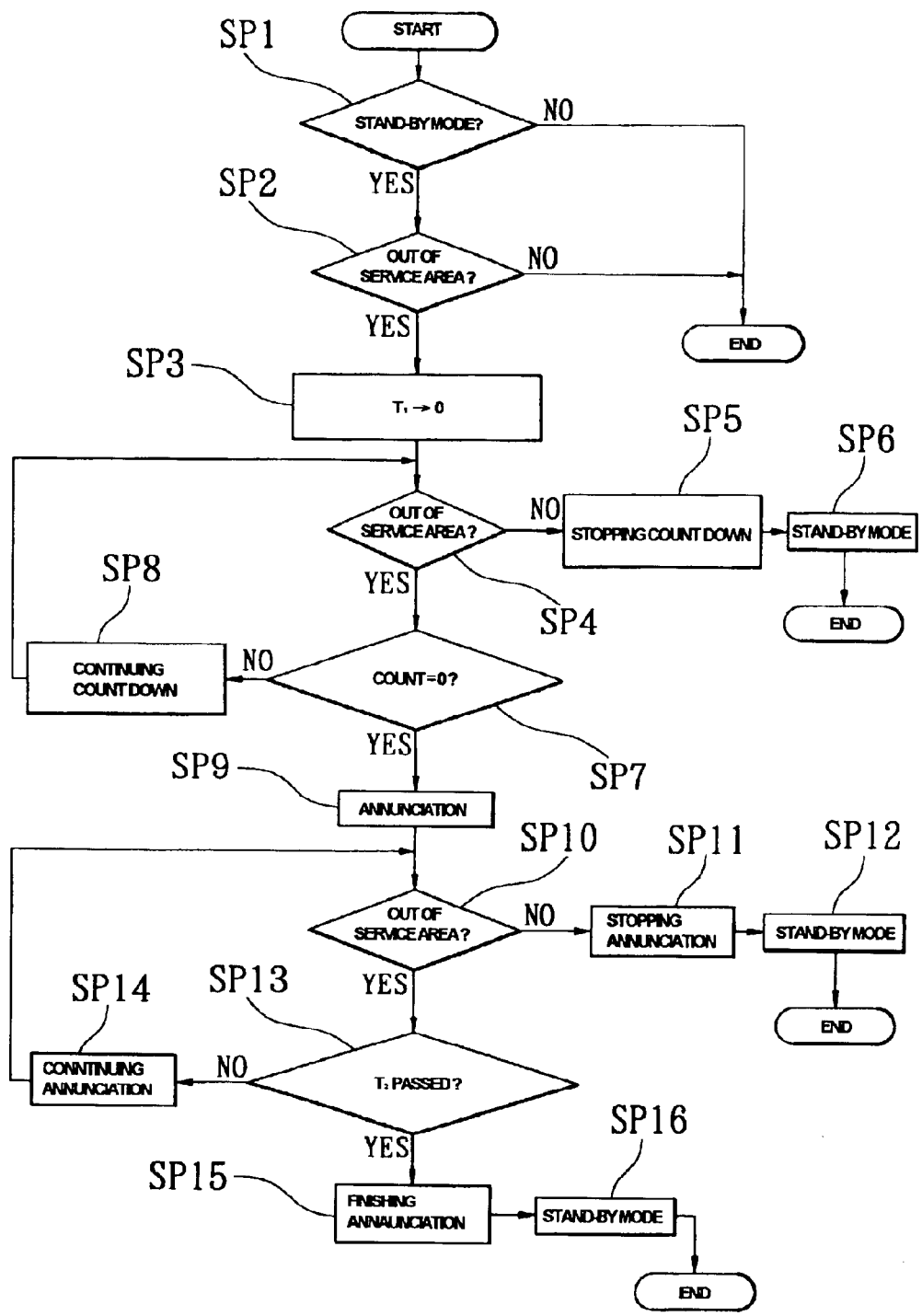
FIG. 2 is a flow-chart of a method of annunciating a user of the mobile telephone illustrated in FIG. 1 that he/she keeps located out of a service area for a predetermined first period of time.

Hereinbelow is explained an operation of the mobile telephone in accordance with the embodiment, with reference to FIG. 2.

In step SP1, the detector fudges whether the mobile telephone is in a stand-by mode where the mobile telephone waits to receive a radio signal from a base station.

If the detector 5 judges that the mobile telephone is not in a stand-by mode, that is, the mobile telephone is making communication (NO in step SP1), the detector 5 finishes an operation of annunciating to a user that he/she has been out of a service area.

If the detector 5 judges that the mobile telephone is in a stand-by mode (YES in step SP1), the detector 5 judges whether the mobile telephone is located out of a service area, based on an output signal transmitted from the field intensity detector 4, in step SP2.

If the detector 5 judges that the mobile telephone is located within a service area (NO in step SP2), the detector 5 finishes an operation of annunciating to a user that he/she has been out of a service area.

If the detector 5 judges that the mobile telephone is located out of a service area (YES in step SP2), the detector 5 transmits the detection signal $S_{AO}$ to the timer 6. On receipt of the detection signal $S_{AO}$ from the detector 5, the timer 6 starts counting down by one clock from the first period of time T1 to zero, in step SP3.

Then, the detector 5 judges whether the mobile telephone is located out of a service area, based on an output signal transmitted from the field intensity detector 4, in step SP4.

If the detector 5 judges that the mobile telephone is located within a service area (NO in step SP4), the detector 5 stops the timer 6 to count down, in step SP5. Then, the detector 5 initializes the timer 6 to the first period of time T1. Then, the detector 5 returns the mobile telephone into a stand-by mode, in step SP6, and finishes this operation of annunciating to a user that he/she has been out of a service area.

If the detector 5 judges that the mobile telephone is located out of a service area (YES in step SP4), the detector 5 judges whether the timer 6 finishes counting down from the first period of time T1 to zero, or whether a count in the timer 6 becomes zero, in step SP7.

If a count in the timer 6 is not zero, or the timer 6 does not finish counting down yet (NO in step SP7), the detector 5 makes the timer 6 to continue counting down, in step SP8. Then, steps SP4 and SP7 are repeated until a count the timer 6 becomes zero.

If a count in the timer 6 becomes zero, or the timer 6 has finished counting down (YES in step SP7), the detector 5 realizes that the mobile telephone has been out of a service area for the first period of time T1 or longer. Then, the detector 5 drives the annunciator having been determined by a user, to annunciate to a user that he/she has been out of a service area for the first period of time T1 or longer, in step SP9.

Then, the detector 5 judges whether the mobile telephone is located out of a service area, based on an output signal transmitted from the field intensity detector 4, in step SP10.

If the detector 5 judges that the mobile telephone is located within a service area (NO in step SP10), the detector 5 stops driving the annunciator to thereby stop annunciation to a user, in step SP11.

Then, the detector 5 returns the mobile telephone into a stand-by mode, in step SP12, and finishes the operation of annunciating a user that he/she keeps located out of a service area.

If the detector 5 judges that the mobile telephone is located out of a service area (YES in step SP10), the detector 5 judges in step SP13 whether the second period of time T2 has passed after annunciation by means of the selected annunciator had started.

If the detector 5 judges that the second period of time T2 has not passed yet (NO in step SP13), the detector 5 continues driving the annunciator to carry out annunciation to a user, in step SP14. Then, steps SP10 and SP13 are repeated until the detector 5 judges whether the second period of time T2 has passed (YES in step SP13).

If the detector 5 judges that the second period of time T2 has passed (YES in step SP13), the detector 5 stops driving the annunciator, in step SP15. Then, the detector 5 returns the mobile telephone into a stand-by mode, in step SP16, and finishes the operation of annunciating to a user that he/she has been out of a service area.

In accordance with the above-mentioned embodiment, when the mobile telephone keeps located out of a service area for the predetermined first period of time T1, while the mobile telephone is in a stand-by mode, the mobile telephone annunciates to a user that he/she has been out of a service area for the predetermined first period of time T1, by means of the annunciator which a user has in advance selected, such as the vibrator 12, by the second period of time T2.

Hence, a user can soon realize that he/she keeps located out of a service area for the predetermined first period of time T1, even when he/she puts the mobile telephone in a bag, and accordingly, he/she cannot look at an indicator displayed in the display screen 13 which indicator indicates that the mobile telephone is now located out of a service area.

In accordance with the above-mentioned embodiment, only when the mobile telephone keeps located out of a service area for the predetermined first period of time T1, annunciation to a user is carried out. Accordingly, for instance, when a user walks repeatedly into a service area and out of a service area, annunciation is not repeated each time a user walks out of a service area.

In accordance with the above-mentioned embodiment, even when a user forgets having a mobile telephone with him/her, he/she is automatically annunciated that he/she keeps located out of a service area for the predetermined first period of time T1. The annunciation makes a user realize that he/she has a mobile telephone with him/her, and that he/she is now located out of a service area. Thus, even when a user made an appointment with somebody to meet each other at a place located out of a service area, somebody can give a call to a user to change a place to meet each other.

In accordance with the above-mentioned embodiment, since a user can realize that he/she keeps located out of a service area for the predetermined first period of time T1, by means of the annunciator, he/she may move into a service area or turn off the mobile telephone, which ensures that a battery equipped in the mobile telephone could lengthen its lifetime. This is because that a battery for the mobile telephone consumes much more power out of a service area than in a service area, because various detection operations have to be carried out, if the mobile telephone is located out of a service area.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

In the above-mentioned embodiment, the first period of time T1 is stored in the memory equipped in the timer 6. However, the first period of time T1 may be stored in the memory 8 or a memory equipped in the controller 7 or the detector 5.

Similarly, the second period of time T2 may be stored in a memory equipped in the controller 7 or the detector 5, as well as in the memory 8.

In the above-mentioned embodiment, the first and second period of times T1 and T2 and the annunciator are determined by a user through the mobile telephone. As an alternative, the mobile telephone may be designed to be connected to an external device, and a user may determine the first and second period of times T1 and T2 and the annunciator through the external device.

In the above-mentioned embodiment, after the annunciator has carried out annunciation to a user for the second period of time T2, the annunciator stops the annunciation. As an alternative, the annunciator may be designed to be compulsively stopped when a user actuates a predetermined key in the interface 9 while the annunciation is carrying out the annunciation.

Though the second period of time T2 is designed to be determined by a user through the interface 9 in the above-mentioned embodiment, the second period of time T2 may be determined to be a fixed period of time when the mobile telephone is fabricated in a factory, in which case, the annunciation is compulsively stopped when a user actuates a predetermined key in the interface 9 while the annunciation is carrying out the annunciation.

In the above-mentioned embodiment, after the annunciation has been finished, the detector 5 returns the mobile telephone to a stand-by mode in step SP16. As an alternative, the detector 5 may interrupt power supply to the mobile telephone to turn off the mobile telephone, after the annunciation has been finished.

In the above-mentioned embodiment, the timer 6 is designed to start counting down by one clock from the first period of time T1 to zero, on receipt of the detection signal $S_{AO}$ from the detector 5. As an alternative, the timer 6 may be designed to count up from zero by one clock on receipt of the detection signal $S_{AO}$ from the detector 5, and transmit a time-up signal, when a count reaches the predetermined first period of time T1, to the detector 5.

In addition, the mobile telephone in accordance with the above-mentioned embodiment may be designed to have other annunciator than the handset 10, the sounder 11 and the vibrator 12. Furthermore, the mobile telephone may be designed to have two or more annunciators.

The present invention may be applied to various mobile telephones such as a cellular phone or PHS.

The entire disclosure of Japanese Patent Application No. 11-264035 filed on Sep. 17, 1999 including specification, claims, drawings and summary is incorporated herein by reference in its entirety.

What is claimed is:

1. A method of operating a mobile telephone, comprising:
   annunciating through at least one of sounds and vibration when said mobile telephone has been out of a service area for a predetermined first period of time and is in a stand-by mode; and
   setting a second period of time regarding a duration of said annunciating.

2. A method of operating a mobile telephone, comprising:
   setting one of a predetermined first period of time and a second period of time while said telephone is operating;
   annunciating through at least one of sounds and vibration when said mobile telephone has been out of a service area for said predetermined first period of time and is in a stand-by mode, wherein said second period of time regarding a duration of said annunciating is fixed; and
   ceasing said annunciating in response to actuation of a predetermined key.

3. A mobile telephone comprising:
   a detector that transmits a detection signal when said detector detects that said mobile telephone is in a stand-by mode and is located out of a service area;
   a timer that starts measuring a period of time in response to said detection signal;
   an annunciator that makes at least one of sounds and vibration when the period of time measured by said timer reaches a predetermined first period of time; and
   an interface through which data can be input into said mobile telephone, and wherein a second period of time regarding a duration of said annunciation can be determined by a user through said interface while said telephone is operating.

* * * * *